C. M. YOUNG.
HARVESTER.
No. 188,459. Patented March 13, 1877.
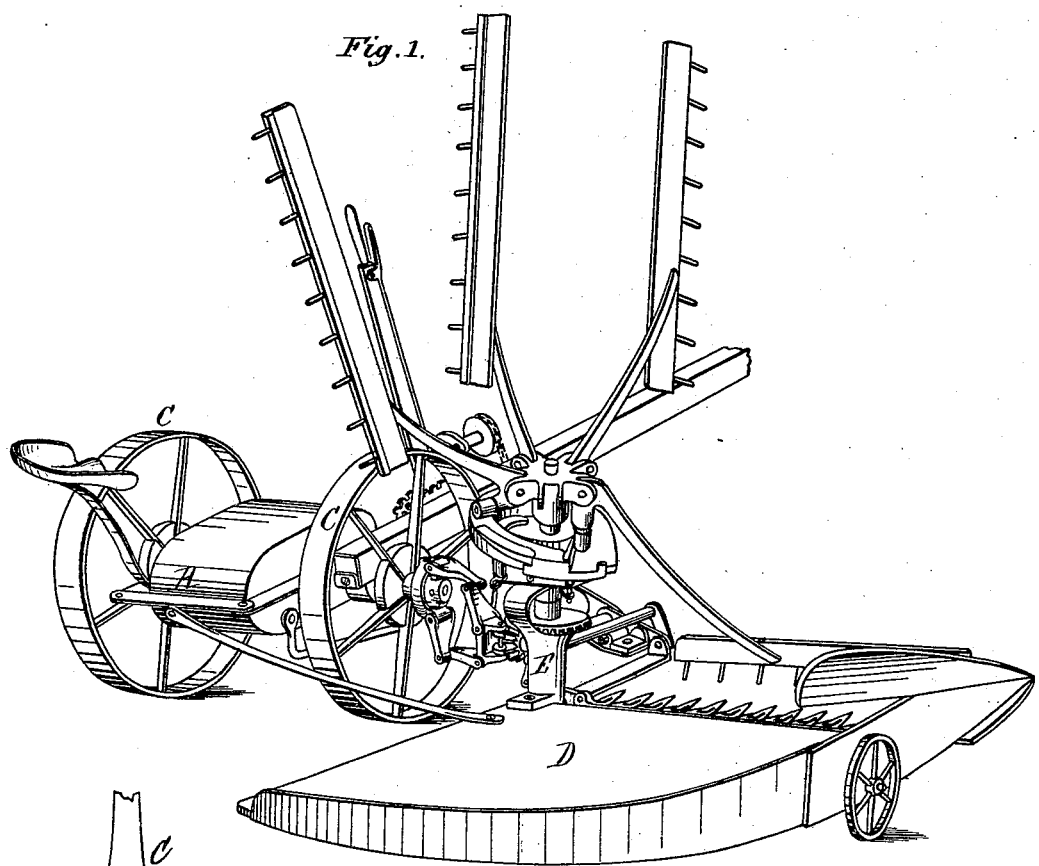
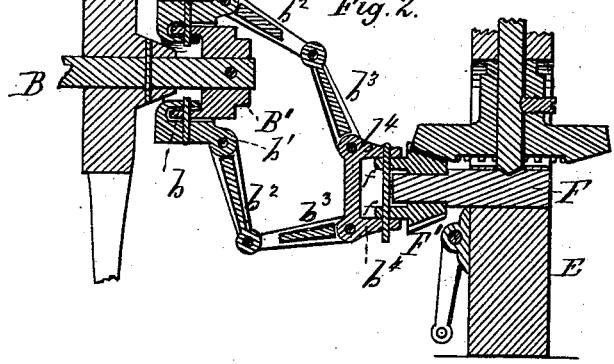

UNITED STATES PATENT OFFICE.

CHARLES M. YOUNG, OF MEADVILLE, PENNSYLVANIA.

IMPROVEMENT IN HARVESTERS.

Specification forming part of Letters Patent No. 188,459, dated March 13, 1877; application filed June 7, 1876.

*To all whom it may concern:*

Be it known that I, CHARLES M. YOUNG, of Meadville, county of Crawford, State of Pennsylvania, have invented certain new and useful Improvements in Rake-Driving Mechanism for Harvesters, of which the following is a full, clear, and exact description, reference being had to the accompanying drawing, making part of this specification, in which—

Figure 1 is a perspective view of a reaping-machine, showing the rake-driving coupling applied. Fig. 2 is a longitudinal section through the coupling, showing the manner of connecting it with the main axle and bevel-pinion which drives the rake-shaft.

My invention consists in a novel construction of universal coupling for driving the rakes and reels of harvesting-machines, whereby the platform upon which said rake and reel arms are mounted is left free to follow the inequalities of the ground without binding or straining the driving mechanism, all as hereinafter explained.

In the accompanying drawings, A represents the main frame, B the axle, and C C the driving-wheels, of a harvesting-machine. D is the platform, connected to the main frame in any usual manner. E is the rake-standard, mounted upon and rigidly secured to the platform D. These parts, being similar in construction to those in general use, need not be particularly described, except so far as is necessary to illustrate my improvements.

In the drawings I have shown the platform connected to the main frame in such manner that the forward edge of the finger-bar is brought into the same transverse vertical plane with the main axle, which brings the rake-standard also in line therewith, for a purpose hereinafter explained.

The main axle B is extended out beyond the hub of the inner driving-wheel, and has mounted upon and rigidly secured to it a collar, $B^1$, said collar being provided with inwardly-projecting arms or lugs $b$, which form the support for, and in which a second collar, $B^2$, has its pivotal bearings. This collar-block $B^2$ has cast with it two perforated lugs or ears, arranged on opposite sides of and eccentric to the rotating shaft or axle, to which said block is pivoted, and to these lugs or ears the inner ends of the inner part $b^2$ of the two toggle-links $b^2$ $b^3$ $b^2$ $b^3$ are connected by separate pivots, arranged at right angles to the pivot connecting the collar-block $B^2$ with its shaft, and on opposite sides of said shaft the outer parts $b^3$ of said toggle-links being similarly connected with a collar-block, $b^4$, hereinafter referred to.

To the rake-standard E, and in the same vertical plane with the shaft of the bevel-gear that drives the rake-shaft, is secured a short horizontal stud-axle, F, upon which is mounted the bevel-pinion $F'$, which communicates motion to the bevel-gear on the rake-shaft. The rear face of this pinion $F'$ is provided with lugs or ears $f$, said ears having the collar $b^4$ connected therewith, and forming a pivotal bearing therefor.

It will be seen that by this construction the rake is driven by a positive movement from the main axle, while at the same time the platform upon which it is mounted is free to follow the inequalities of the ground without binding or straining the driving mechanism.

It will also be seen that by bringing the rake into line, or nearly so, with the driving-shaft, the relative movement of the parts is greatly facilitated, though the same object can be accomplished in other ways—as, for instance, a stud-axle having a gear-wheel mounted and receiving motion from the main axle may have the collars $B^1$ and $B^2$ connected therewith, by which means the improvement may be used either in a front or rear cut machine.

Having now described my invention, what I claim as new, and desire to secure by Letters Patent, is—

The combination, with a harvester-rake or rake and reel combined, of the extensible tumbling driving-coupling, composed of the pivoted collar-blocks $B^2$ $b^4$ and the two toggle-links $b^2$ $b^3$ $b^2$ $b^3$, separately pivoted to said blocks at opposite sides of and eccentrically to their axes or centers of rotation, substantially as and for the purpose described.

CHARLES M. YOUNG.

Witnesses:
A. A. ASPINWALL,
GEO. H. GIBBS.